(12) United States Patent
Greenzeiger et al.

(10) Patent No.: US 11,017,425 B2
(45) Date of Patent: May 25, 2021

(54) OPTIMIZATION OF PROMOTIONAL CONTENT CAMPAIGNS

(71) Applicant: Apple Inc., Cupertino, CA (US)

(72) Inventors: Michael Froimowitz Greenzeiger, Sunnyvale, CA (US); Weining Zhou, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1236 days.

(21) Appl. No.: 14/044,109

(22) Filed: Oct. 2, 2013

(65) Prior Publication Data
US 2015/0095140 A1     Apr. 2, 2015

(51) Int. Cl.
*G06Q 30/02*     (2012.01)
(52) U.S. Cl.
CPC .............................. *G06Q 30/0244* (2013.01)
(58) Field of Classification Search
None
See application file for complete search history.

(56) References Cited

U.S. PATENT DOCUMENTS

| | | | |
|---|---|---|---|
| 8,099,757 B2 | 1/2012 | Riedl et al. | |
| 8,370,197 B2 * | 2/2013 | Axe | G06Q 30/02 705/14.41 |
| 8,429,282 B1 * | 4/2013 | Ahuja | H04L 47/19 709/219 |
| 8,788,944 B1 * | 7/2014 | Gill | G06F 8/61 715/744 |
| 9,326,189 B2 * | 4/2016 | Luna | H04L 67/306 |
| 9,460,461 B1 * | 10/2016 | Gill | G06Q 30/0641 |
| 2008/0160956 A1 * | 7/2008 | Jackson | H04W 4/029 455/406 |
| 2008/0288328 A1 | 11/2008 | Minor et al. | |
| 2010/0131352 A1 * | 5/2010 | Malhotra | G06Q 30/02 705/14.42 |
| 2011/0258049 A1 | 10/2011 | Ramer et al. | |
| 2012/0036498 A1 * | 2/2012 | Akirekadu | G06F 11/3495 717/124 |
| 2012/0197727 A1 * | 8/2012 | Kim | G06Q 30/02 705/14.64 |
| 2012/0278164 A1 | 11/2012 | Spivack et al. | |
| 2014/0373137 A1 * | 12/2014 | Muttik | G06F 21/57 726/22 |

OTHER PUBLICATIONS

Chen, Peng, Personalized mobile advertising: it's key attributes, trends and social impact, Elsevier, p. 545, 546 and 547 https://www.sciencedirect.com/science/article/pii/S0040162511001788 (Year: 2011).*

* cited by examiner

*Primary Examiner* — Chrystina E Zelaskiewicz
*Assistant Examiner* — Alfred H Tsui
(74) *Attorney, Agent, or Firm* — Polsinelli LLP (57) ABSTRACT

Disclosed herein are systems, methods, and non-transitory computer-readable storage media for increasing the performance of an advertisement network by monitoring requests for advertisements from applications, detecting patterns, and developing and implementing remedial actions to increase system performance.

18 Claims, 7 Drawing Sheets

OPTIMIZATION OF PROMOTIONAL CONTENT CAMPAIGNS

BACKGROUND

1. Technical Field

The present disclosure relates to promotional content and more specifically to optimizing the promotional content network.

2. Introduction

Many mobile advertising networks are composed of many thousands of content publishers. These mobile advertising networks collaborate with publishers of application programs that drive network traffic in varying degrees. Some application programs drive only a handful of advertisement requests per day while some publishers offer application programs that drive millions of ad requests per day. While it is possible to manually monitor the largest, most important application programs on the network, this solution will simply not scale to cover the massive numbers of smaller application programs. Also, while these smaller application programs are not particularly important to the overall performance of the network individually, when taken in aggregate they can have very significant influence on the performance of the network. Merely bucketing and optimizing these application programs by top level key performance indicators (KPI) such as click-through-rate (CTR), Time Spent, Views, and Conversions is not sufficient to fully address the possible issues which can arise with these numerous, smaller application programs.

Accordingly, there is a need for techniques that examine performance metrics, adjust network operation, and provide feedback to the publishers on how their application programs can be improved to ultimately boost the overall network.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for increasing the performance of an advertisement network by monitoring requests for advertisements from applications, detecting patterns, and developing and implementing remedial actions to increase system performance.

Some embodiments of the present technology involve separating qualified requests from requests that violate one or more rules. The one or more rule can involve rules relating to receiving requests too close together, receiving requests for advertisements that require too much memory to run without the application crashing, requests that are not received etc.

Some embodiments of the present technology involve attributing a threshold change in the number of qualified requests to the publisher of an application using a mediation layer and increasing the value (eCPM) of the advertisements sent to fill requests from that publisher. Some embodiments of the present technology also involve determining whether the advertisements with an increased value bring the number of requests back down to a baseline value and developing a higher value campaign for the publisher.

Some embodiments of the present technology also involve performing an iterative process of testing whether various remedial actions solve a drop in a number of requests.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for techniques that examine performance metrics, adjust network operation, and provide feedback to the publishers on how their application programs can be improved to ultimately boost the overall network.

Systems, methods and non-transitory computer-readable media are disclosed which monitor network conditions across a variety of application programs, detect threshold conditions, obtain knowledge about the causes of the conditions, and take remedial action to address the root causes.

Some embodiments of the present technology involve examining a number of qualified requests for advertisements from an advertisement network and a ratio of qualified requests for advertisements from an advertisement network to a unique user (hereinafter referred to as "Qualified Request/Unique" ratio).

According to the present technology, there are various rules relating to when requests should be considered "qualified" requests. In some cases, for requests to be qualified they need to follow rules regarding request frequency. In some cases the rules relate to requests that come from specific localities (e.g. US only), specific devices (e.g. iPhone 4 and newer), specific versions of an Operating System (e.g. iOS 6.0+), or site content ratings (e.g. apps suitable for a certain age group or not containing lewd, political or religious material).

Also, in some cases, the type/quality of network connectivity (e.g. only 3G or better) is considered when determining whether a request is qualified. Additionally, the system can determine the connection (regardless of whether it's 3G, WiFi, etc.) by bandwidth in kbps. If a user had below a certain threshold over a sustained period of time, they would not be qualified.

In some cases, traffic with a lower Qualified Request/Unique ratio is potentially more valuable due to its larger reach and the greater ease under which it allows frequency capped campaigns to serve. Additionally, the number of requests per session is important due to the differences in likelihood of tapping at different stages within a user session with an application and need to be normalized by the time between requests for that app. Note, however, that if the requests are too low in absolute terms then the conclusions might not statistically significant and the confidence level should be decreased.

Some embodiments of the present technology involve determining that the use of a mediation layer by a publisher is driving down network traffic and remediating the impact of the mediation layer. Qualified requests from an application program can increase or decline for a number of reasons including growth or decline of the application program itself (e.g. new users, poor retention, etc.), users spending more or less time in the application program, and a publisher or a mediation layer choosing to turn down a number of advertisement from the advertisement network.

Figure 1:
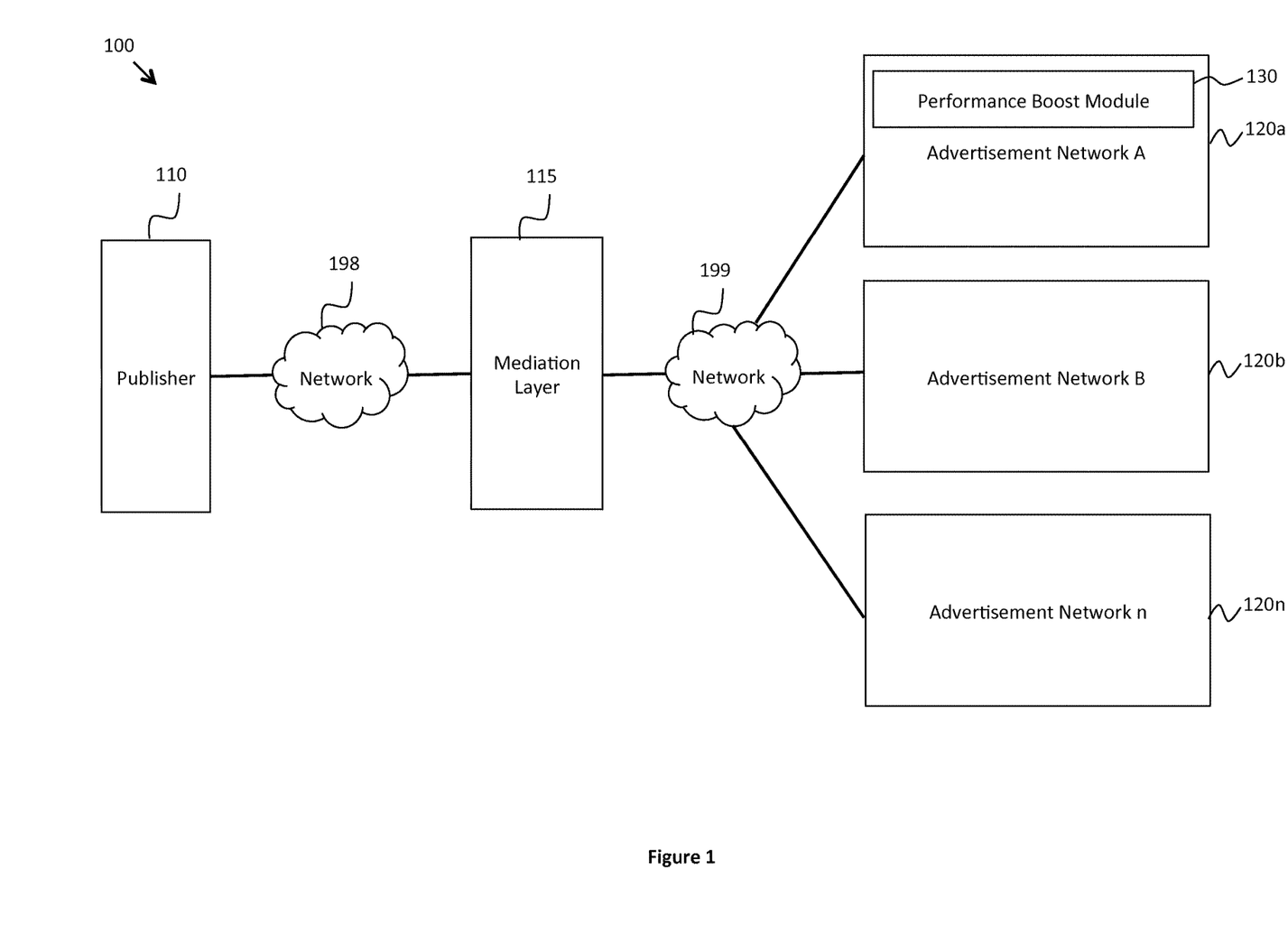
FIG. 1 illustrates an exemplary network environment 100 that utilizes a mediation layer according to some embodiments of the present technology.

FIG. 1 illustrates an exemplary network environment 100 that utilizes a mediation layer according to some embodiments of the present technology. In FIG. 1, an application publisher 110 can request advertisements from a plurality of advertisement networks: $120_a$, $120_b$, . . . , $120_n$. The publisher 110 can choose advertisement networks itself or can use a mediation layer 115. A publisher 110 can access a mediation layer 115 via a network 198; likewise, the mediation layer 115 can be accessed by the advertisement networks $120_a$, $120_b$, . . . , $120_n$ via a network 199.

A mediation layer 115 is a hosted or automated platform that monitors the advertisement networks and coordinates with ad networks to help maximize a publisher's fill rate and increase revenue (e.g. effective cost per thousand impressions, hereinafter "eCPM") from the advertisement networks.

The mediation layer 115 can send requests for advertisements to multiple ad networks to look for the best available network to serve the publisher with advertisements. If a top choice can't fill the request, the mediation layer can iteratively choose next best options in order to maximize advertisement slots being filled and being filled with the most profitable advertisements.

When a publisher 110 uses a mediation layer 120, a given advertisement network $120_a$ will likely experience a change in the Qualified Requests/Unique ratio. Upon a decrease in this ration, it may be desirable to specifically direct more high value advertising campaigns to the application and thus encourage the mediation layer to boost their allocation to the network $120_a$ and increase the network's $120_a$ inventory. Accordingly, in some embodiments of the present technology, the advertisement network $120_a$ can include a performance boost module 130 configured for monitoring various metrics and adjusting the value of advertisements directed to various requestors.

Figure 2:
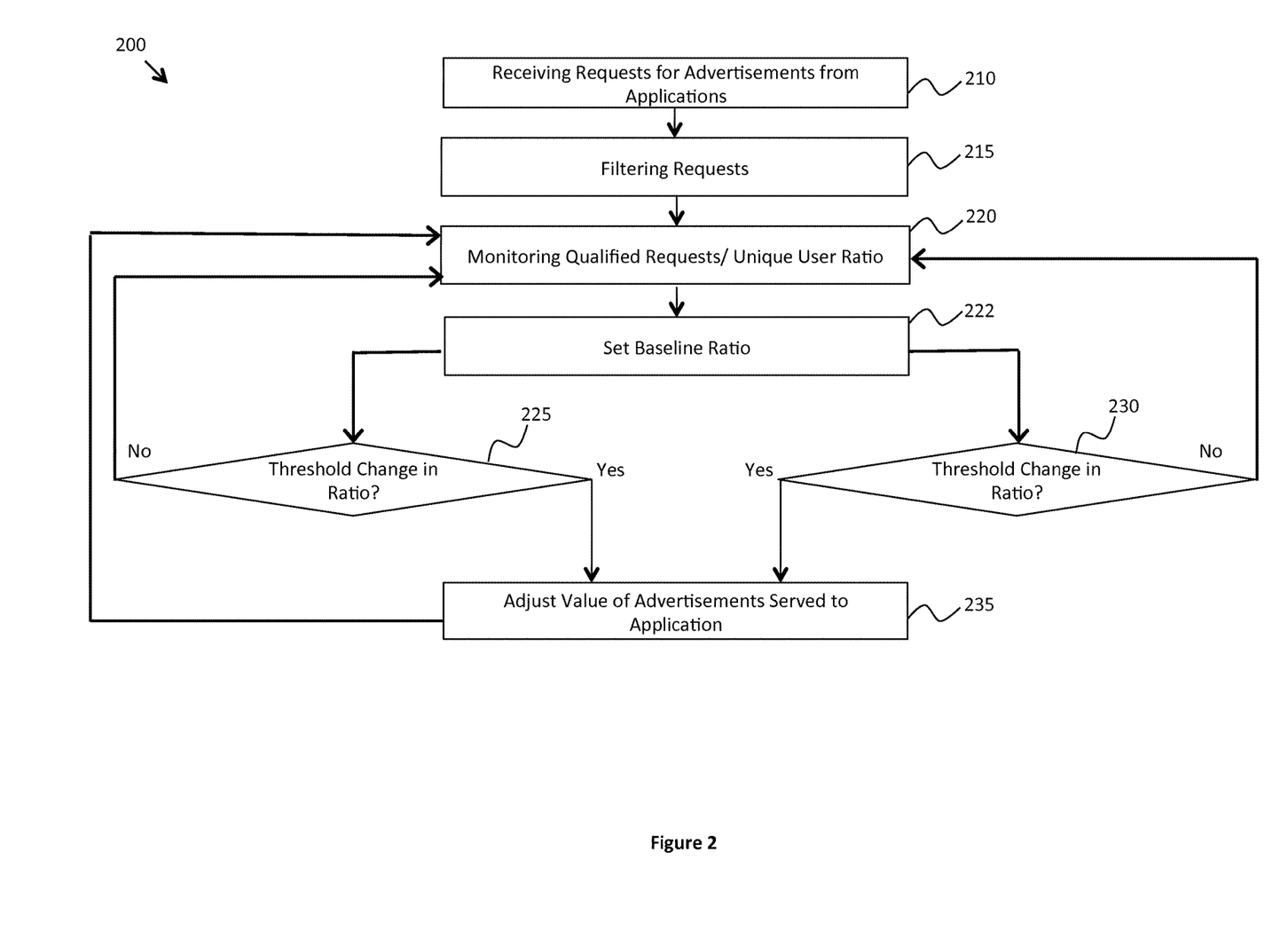
FIG. 2 illustrates a method of monitoring a Qualified Request/Unique Ratio and adjusting the eCPM of advertisements directed to an application according to some embodiments of the present technology.

FIG. 2 illustrates a method 200 of monitoring a Qualified Request/Unique Ratio and adjusting the eCPM of advertisements directed to an application according to some embodiments of the present technology. The method 200 of FIG. 2 begins with a performance boost module of an advertisement network receiving requests for advertisements from an application 210. The performance boost module can filter the requests 215 to ensure that the publisher of the application is only sending qualified requests. For example, the performance boost module can filter out requests that are spaced too close together. The performance boost module then monitors the ratio of the number of qualified requests are received from a unique user 220.

In some embodiments of the present technology, while monitoring the number of qualified requests per unique user, the performance boost module can define a baseline number for comparing to deviations from the baseline. Next, the performance boost module determines whether a threshold change in the Qualified Request/Unique Ratio occurs 225 or whether the Qualified Request/Unique Ratio hits a threshold minimum level 230. If neither occurs, the performance boost module continues to monitor the Qualified Request/Unique Ratio 220. Alternatively, upon detecting one or more threshold event, the performance boost module can adjust the value of the advertisement 235 served to the application (e.g. increased eCPM).

Figure 3:
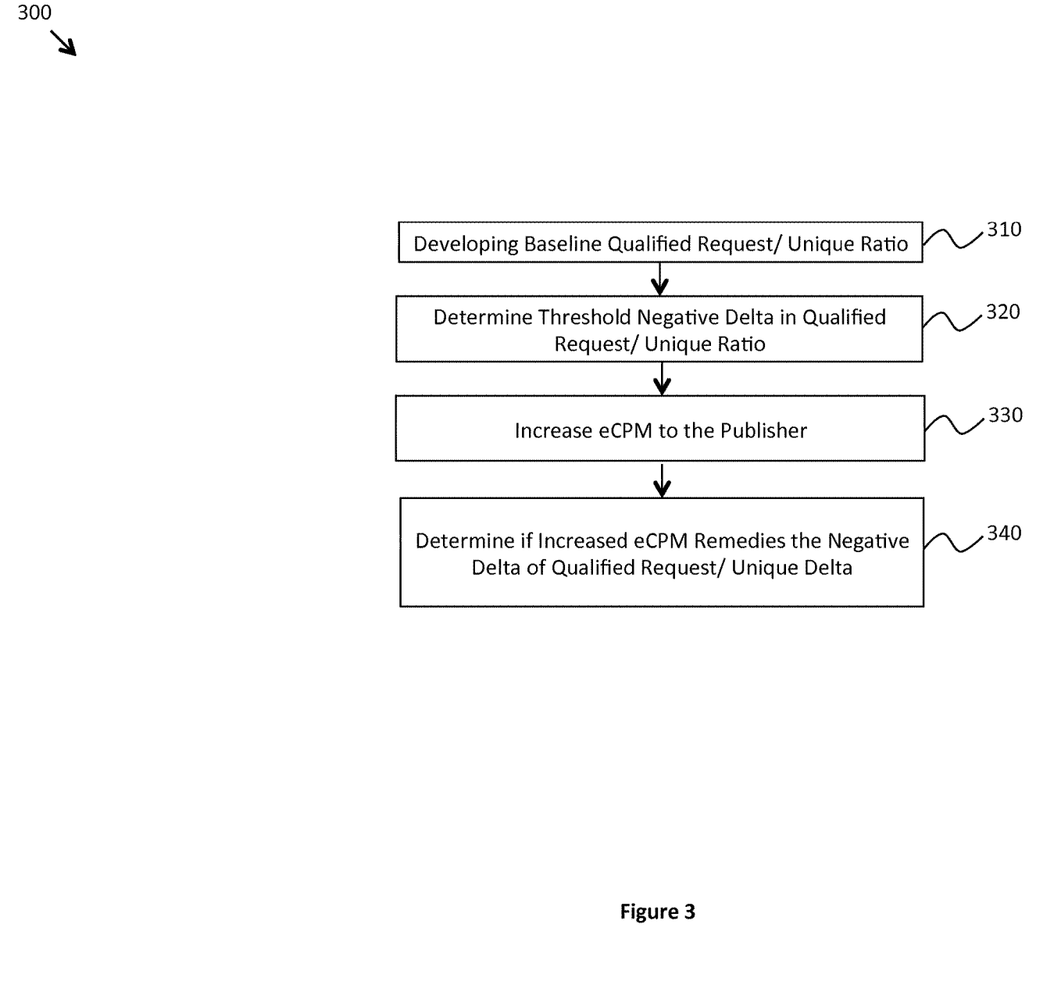
FIG. 3 illustrates a method of testing whether an increase on eCPM remediates a drop in requests according to some embodiments of the present technology.

As explained above, the use of mediation layers is one reason among several reasons why the number of requests decreases. In some embodiments, a performance boost module can also test whether an attempt to boost favor with a mediation level results in an increase in requests. FIG. 3 illustrates a method 300 of testing whether an increase on eCPM remediates a drop in requests according to some embodiments of the present technology. The method 300 involves developing a baseline Qualified Request/Unique Ratio 310, determining a threshold change in the Qualified Request/Unique Ratio 320, increasing the number of advertisements with a high eCPM that are served to a publisher 330, and determining if the increased eCPM remediates the negative change in the Qualified Request/Unique Ratio 340.

There are a number of other reasons that can account for a decreased Qualified Request/Unique Ratio besides, or in concert with, the presence of a mediation layer that bleeds traffic away from an advertisement network. Indeed, some embodiments of the present technology involve a performance boost module determining whether a mediation layer and/or another issue is affecting network performance.

Another reason for a decreased Qualified Request/Unique Ratio is a drop in requests due to a high frequency of an application crashing. Indeed, an application can contribute to poor advertisement network performance if it frequently crashes in the middle of displaying an advertisement. In addition to harming metrics, this also directly harms user experience and the advertisement network will be motivated to encourage publishers to fix their crashing problems. Many times, a large reason that applications crash is due to poor memory management. Two big memory issues are attributed to large memory usage by the advertisement itself and large memory usage by an application.

While many applications can during the display of advertisements to at least a small degree, some applications crash very frequently. Accordingly, some embodiments of the present technology involve, detecting applications with a high crash rate and taking remedial action to avoid the problem. In some embodiments of the present technology, a performance boosting module examines which applications crash significantly more than a baseline and the module flags these crash-prone applications, avoids sending high memory advertisements to the crash-prone application, and reports to the publishers that their applications are crash prone.

Additionally, another reason for a decrease in an advertisement network performance is a large amount of requests that are disqualified due to one or more applications violating the guideline that qualifies a request for inclusion in a Qualified Request/Unique Ratio.

Indeed, some advertisement networks have strict guidelines for how frequently impressions may be refreshed and how long they should be displayed for so as to maximize metrics and customer experience. Nevertheless, not all publishers follow these guidelines and these publishers oftentimes attempt to cycle through impressions more rapidly than is permitted so as to boost their revenue. Some embodiments of the present technology involve monitoring the rate at which requests are received from the application and informing the publisher that a large portion of requests are not being counted and that this could be a reason why it might appear that the advertisement network appears, to the publisher, to have a poor fill rate.

As explained above, some embodiments of the present technology involve determining if a remediation effort addresses decreased network performance. Some other embodiments involve methods of testing a plurality of remediation techniques to determine one or more root causes of a drop in performance.

Figure 4:
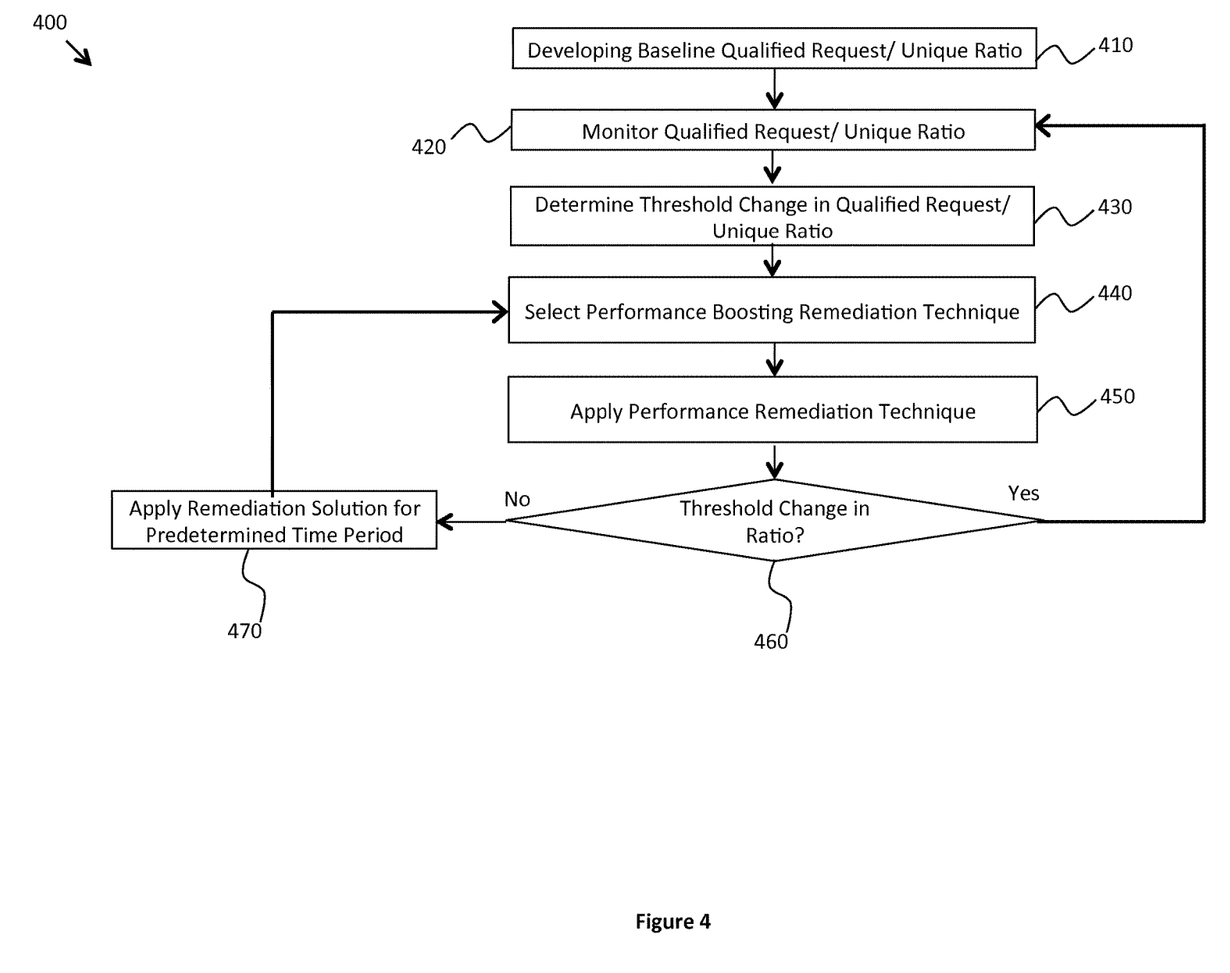
FIG. 4 illustrates a method 400 of iteratively testing a plurality of remediation techniques to determine one or more root causes of a drop in performance

FIG. 4 illustrates a method 400 of iteratively testing a plurality of remediation techniques to determine one or more root causes of a drop in performance. The method 400 begins with a performance boost module determining a baseline Qualified Request/Unique value 410. Next, the performance boost module monitors the Qualified Request/Unique value 420 and determines a threshold change in the Qualified Request/Unique value 430. In response to the determination of the threshold change, the performance boost module selects one or more performance boosting remediation technique 440.

The method 400 continues with applying the selected techniques 450 and determining whether the selected performance boosting remediation worked to increase the Qualified Request/Unique value 460. If the selected technique was successful in increasing the Qualified Request/Unique value, the performance boosting technique is applied for a predetermined time period 470 and continuing to monitor the Qualified Request/Unique value 420. If the selected technique was not successful in increasing the Qualified Request/Unique value, the method 400 involves iteratively selecting performance boosting remediation techniques 440 in an attempt to discover an appropriate remedial action.

In addition to applying a remediation technique, some embodiments of the present technology involve informing the publisher how they could increase their revenue (e.g. by not violating a minimum time between requests policy). However, it is oftentimes the case that users of an application have old versions of an operating system or an outdated version of an application and that the new versions of the operating system or the application has already remediated the problem that caused the decreased performance of the network.

Accordingly, some embodiments of the present technology involve examining the above metric in light of the version of the operating system and by the version of the application to determine whether any problems detected are only affecting certain segments of the traffic so that the solution can be tailored to a specific segment of users experiencing the problem.

Indeed, in some cases, the application version is particularly critical to monitor because it can be the case that the publisher has actually already fixed the problem in a newer release of their application, but users are being slow to adopt it. In this case, it is not necessary to alert the publisher since they have already fixed the problem; however, it may be desirable to avoid serving advertisements into the older versions of the application.

In some embodiments, a system administrator can chose to utilize these strategies before, after, or concurrent with taking into account the value of the traffic in terms of basic key performance indicators or its strategic value (e.g. a well known brand name application is desirable to advertisers regardless of performance).

Figure 5:
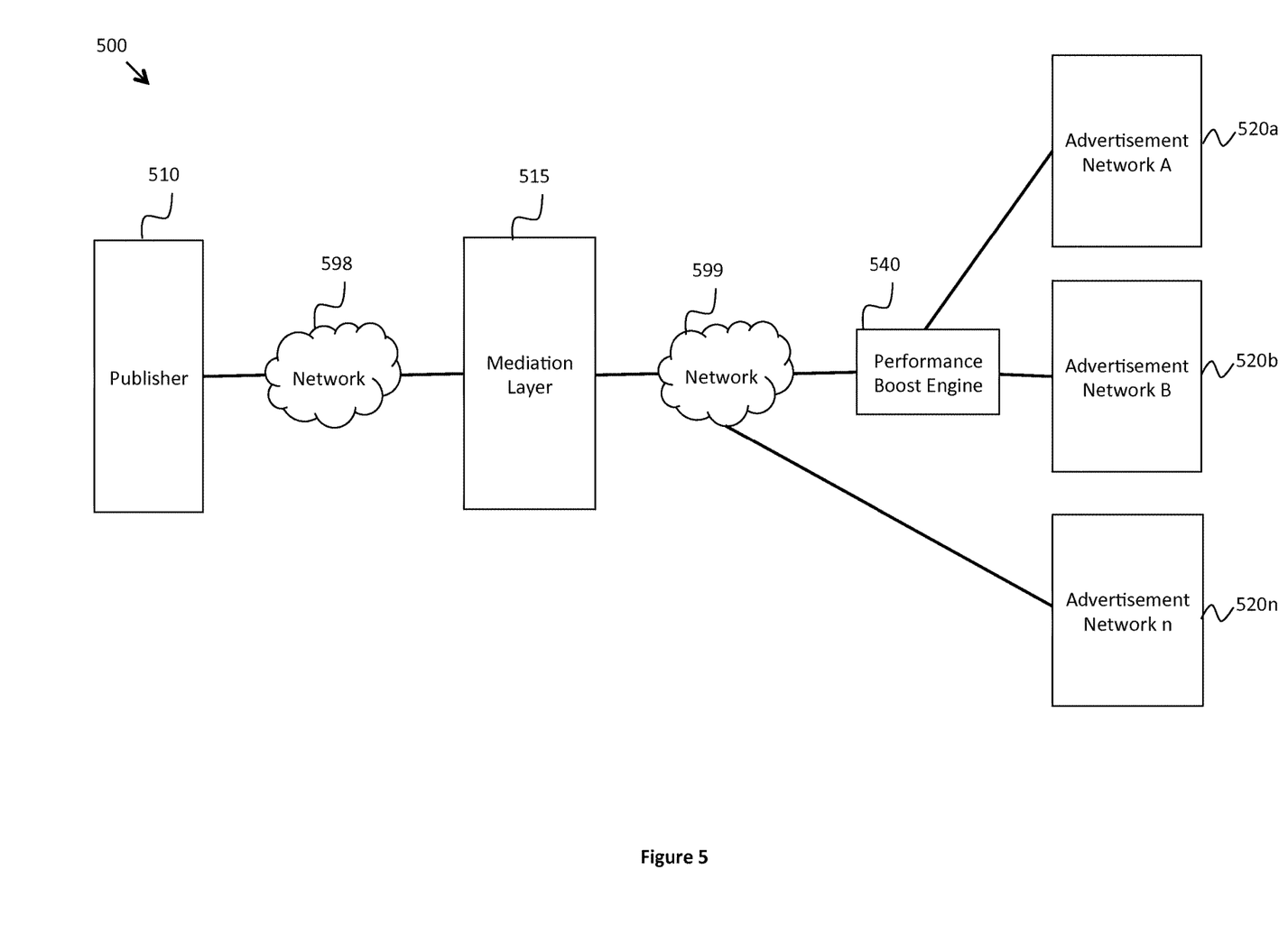
FIG. 5 illustrates an exemplary network environment with a mediation layer and a performance boost engine according to some embodiments of the present technology.

As explained in FIG. 1 above, a performance boost module 130 that is part of an advertisement network $120_a$ can be used to select network performance remediation techniques. Some other embodiments involve an external performance boost engine available for use by one or more advertisement network. FIG. 5A illustrates an exemplary network environment 500 with a mediation layer 515 and a performance boost engine 540 according to some embodiments of the present technology. Accordingly to FIG. 5, an application publisher 510 can request advertisements from a plurality of advertisement networks: $520_a$, $520_b$, . . . , $520_n$. The publisher 510 can choose advertisement networks itself or can use a mediation layer 515. A publisher 510 can access a mediation layer 515 via a network 598; likewise, the mediation layer 515 can be accessed by the advertisement networks $520_a$, $520_b$, . . . , $520_n$ via a network 599. Additionally, advertisement networks $520_a$, $520_b$, . . . , $520_n$ are operatively coupled with a performance boost engine 540 configured for monitoring various metrics and adjusting the value of advertisements directed to various requestors.

The foregoing metrics and remediation techniques can be reported in a variety of ways. In some embodiments, they are merely compiled into a report on the largest applications that are experiencing the issue so as to allow our publisher team to respond directly to those users. In some embodiments, it may be desirable to have the system directly notify the application publisher that their application is out of policy or is experiencing issues that may be impacting their performance and revenue. In some embodiments, the advertisement network could directly takes these under-the-hood metrics for apps into account when making determinations for which apps to serve individual impressions to or even exclude entirely from receiving advertisements if the problem is severe enough.

Some embodiments of the present technology also involve a performance boost engine or a performance boost module collecting data from a plurality of application publishers and deriving the above mentioned remediation techniques from the data.

Figure 6A:
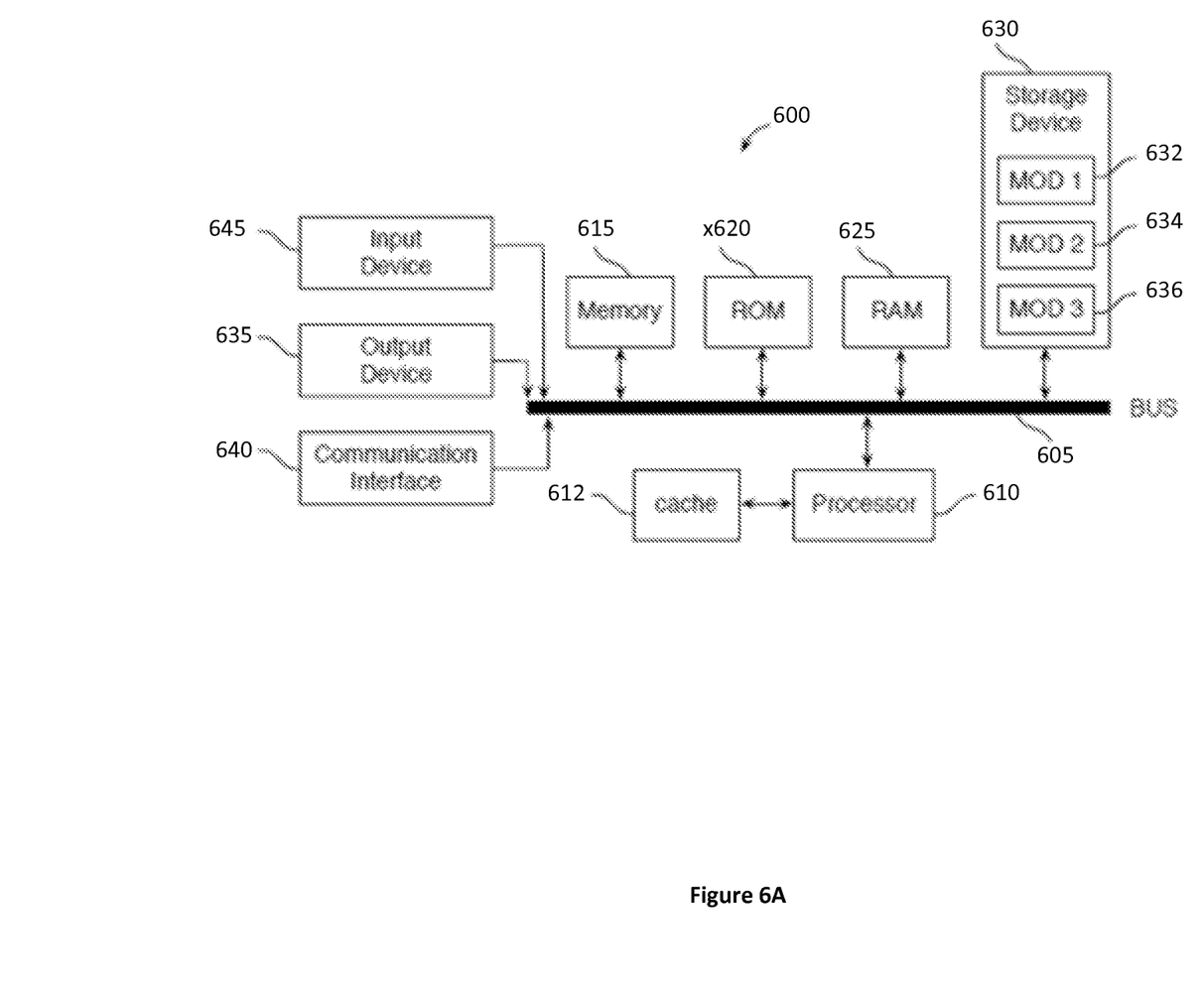
FIG. 6A and FIG. 6B illustrate exemplary possible system embodiments.
Figure 6B:
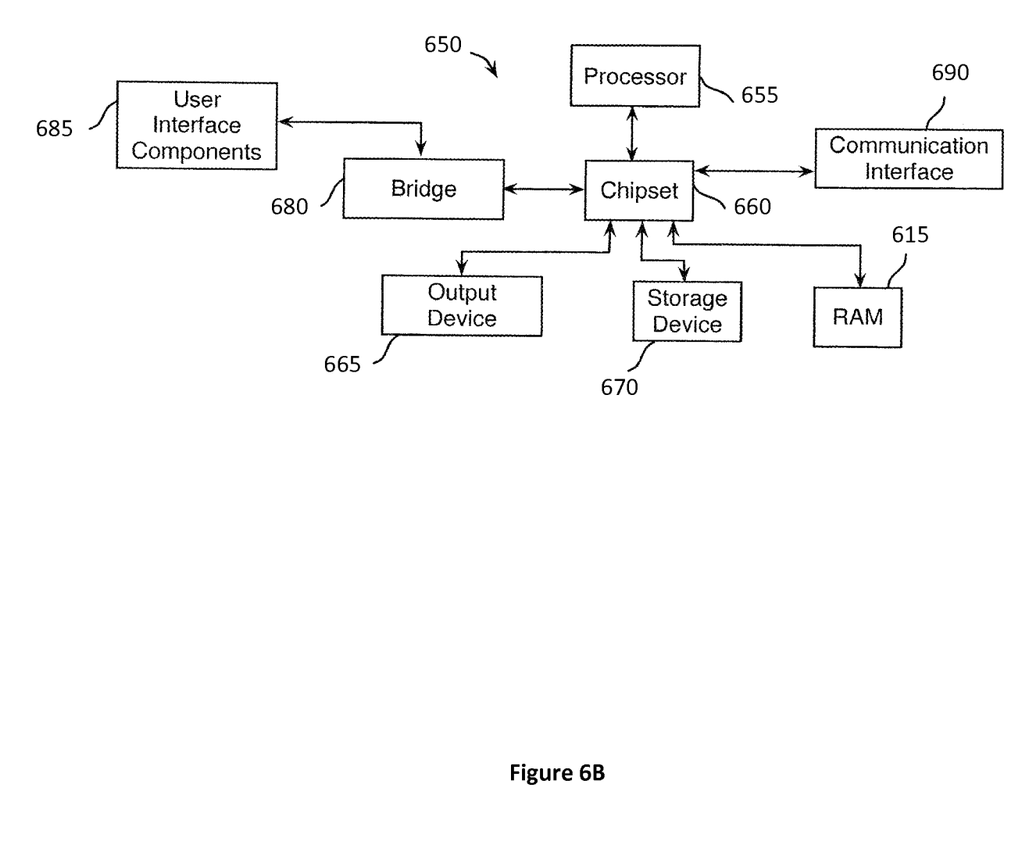

FIG. 6A and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure

We claim:

1. A method comprising:
identifying requests for promotional content that are received from applications by an advertising network;
identifying qualified requests and non-qualified requests from the requests for the promotional content, wherein a request is a qualified request when it compiles with at least a set of rules and is non-qualified when it does not comply with the at least the set of rules;
defining a baseline for the qualified request per unique requesting application;
detecting a threshold change in the baseline for the qualified request per unique requesting application by determining that the threshold change k at least partially caused by a crash rate of the unique requesting application exceeding a threshold crash rate;
generating a notification indicating that the crash rate of the unique requesting application has exceeded the threshold crash rate; and
decreasing an amount of promotional content sent in response to the requests from the unique requesting application until, based on monitoring the baseline for the qualified request per unique requesting application; the crash rate has returned to the baseline for the qualified request per unique requesting application.

2. The method of claim 1, further comprising:
attributing the threshold change in the baseline for the qualified request per unique requesting application to a mediation layer between the requesting applications and a promotional content provider.

3. The method of claim 1, further comprising:
increasing a value of promotional content sent to the unique requesting application.

4. The method of claim 3, further comprising:
monitoring the baseline for the qualified request per unique requesting application;
determining that the increased value of the promotional content decreases the baseline for the qualified request per unique requesting application; and
increasing the value of the promotional content sent to the unique requesting application for a predetermined time period.

5. The method of claim 1, wherein the at least the set of rules for which the non-qualified requests do not comply is provided by a promotional content provider, and wherein the method further comprises:
attributing the threshold change in the baseline for the qualified request per unique requesting application to an increased incidence of the unique requesting application requesting the promotional content in a manner that violates the at least the set of rules provided by the promotional content provider; and
notifying a publisher that the non-qualified requests of the unique requesting application violates the at least the set of rules.

6. The method of claim 1 comprising:
iteratively selecting a remediation action; and
iteratively determining whether the remediation action remediates the threshold change in the baseline for the qualified request per unique requesting application.

7. A system comprising:
a processor; and
a memory containing instructions that, when executed, cause the processor to:
identify requests for promotional content that are received from applications by an advertising network;
identify non-qualified requests and qualified requests from the requests for the promotional content, wherein a request is a qualified request when it complies with at least a set of rules and is non-qualified when it does not comply with the at least the set of rules;
define a baseline for the qualified request per unique requesting application;
detect a threshold change in the baseline for the qualified request per unique requesting application by determining that the threshold change is at least partially caused by a crash rate of the unique requesting application exceeding a threshold crash rite;
generate a notification indicating that the crash rate of the unique requesting at application has exceeded the threshold crash rate; and
decreasing an amount of promotional content sent in response to the requests from the unique requesting application unto, based on monitoring the baseline for the qualified request per unique requesting application, the crash rite has returned to the baseline for the qualified request per unique requesting application.

8. The system of claim 7 further comprising:
the memory containing further instructions that, when executed, cause the processor to:
attribute the threshold change in the baseline qualified request per unique requesting application to a mediation layer between the requesting applications and a promotional content provider.

9. The system of claim 7, further comprising:
increasing a value of the promotional content sent to the unique requesting application.

10. The system of claim 9 further comprising:
the memory containing further instructions that, when executed, cause the processor to:

monitor the baseline qualified request per unique requesting application;
determine that the increased value of the promotional content decreases the baseline qualified request per unique requesting application; and
increase the value of the promotional content sent to the unique requesting application for a predetermined time period.

11. The system of claim 7, wherein the at least the set of rules for which the non-qualified requests do not comply is provided by a promotional content provider, and wherein the memory containing further instructions that, when executed, cause the processor to:
attribute the threshold change in the baseline qualified request per unique requesting application to an increased incidence of the unique requesting application requesting the promotional content in a manner that violates the at least the set of rules provided by the promotional content provider, and notify a publisher that the non-qualified request of the unique requesting application violates the at least the set of rues.

12. The system of claim 7 further comprising:
the memory containing further instructions that, when executed, cause the processor to:
iteratively select a remediation action; and
iteratively determine whether the remediation action remediates the threshold change in the baseline qualified request per unique requesting application.

13. A non-transitory computer-readable medium storing instructions that, when executed by one or more processors, cause the one or more processors to:
identify requests for promotional content that are received from applications by an advertisement network;
identify qualified requests and non-qualified requests from the requests for the promotional content, wherein a request is a qualified request when it complies with at least a set of rules and is non-qualified when it does not comply with the at least the set of rules;
define a baseline for the qualified request per unique requesting application;
detect a threshold change in the baseline for the qualified request per unique requesting application by determining that the threshold change is at least partially caused by a crash rate of the unique requesting application exceeding a threshold crash rate;
generate a notification indicating that the crash rate of the unique requesting application has exceeded the threshold crash rate; and
decrease an amount of promotional content sent in response to the requests from the unique requesting application until, based on monitoring the baseline for the qualified request per unique requesting application, the crash rate has returned to the baseline for the qualified request per unique requesting application.

14. The non-transitory computer-readable medium of claim 13, further comprising instructions that, when executed, cause the processor to:
attribute the threshold change in the baseline for the qualified request per unique requesting application to a mediation layer between the requesting applications and a promotional content provider.

15. The non-transitory computer-readable medium of claim 13, further comprising:
increasing a value of the promotional content sent to the unique requesting application.

16. The non-transitory computer-readable medium of claim 15,
further comprising instructions that, when executed, cause the processor to:
monitor the baseline for the qualified request per unique requesting application;
determine that the increased value of the promotional content decreases the baseline for the qualified request per unique requesting application; and
increase the value of the promotional content sent to the unique requesting application for a predetermined time period.

17. The non-transitory computer-readable medium of claim 13, the at least the set of rules for which the non-qualified requests do not comply is provided by a promotional content provider, and wherein the instructions that, when executed, cause the processor to:
attribute the threshold change n the baseline for the qualified request per unique requesting application to an increased incidence of the unique requesting application requesting the promotional content in a manner that violates the at least the set of rules provided by the promotional content provider, and
notify a publisher that the non-qualified requests of the unique requesting application violates the at least the set of rules.

18. The non-transitory computer-readable medium of claim 13, further comprising instructions that, when executed, cause the processor to:
iteratively select a remediation action; and
iteratively determine whether the remediation action remediates the threshold change in the baseline for the qualified request per unique requesting application.

* * * * *